United States Patent [19]

Lindner et al.

[11] Patent Number: 4,794,167

[45] Date of Patent: Dec. 27, 1988

[54] PROCESS FOR THE PREPARATION OF POLYMER POWDERS BY SPRAY DRYING

[75] Inventors: Christian Lindner, Cologne; Edwin Roth, Bergisch-Gladbach; Otto Koch; Hans-Eberhard Braese, both of Cologne; Pol Bamelis, Overath, all of Fed. Rep. of Germany

[73] Assignee: Bayer Akteingesellschaft, Leverkusen, Fed. Rep. of Germany

[21] Appl. No.: 126,306

[22] Filed: Nov. 27, 1987

[30] Foreign Application Priority Data

Dec. 10, 1986 [DE] Fed. Rep. of Germany ....... 3642106

[51] Int. Cl.$^4$ .............................. C08J 3/12; C08J 3/16
[52] U.S. Cl. ................................... 528/501; 528/486; 528/488; 528/490; 523/340; 428/402
[58] Field of Search ............... 528/501, 486, 488, 490; 523/340, 342, 352; 428/402

[56] References Cited

U.S. PATENT DOCUMENTS

| 3,198,773 | 8/1965 | Stoloff | 523/342 X |
| 3,503,948 | 3/1970 | Walters et al. | 528/495 X |
| 4,292,424 | 9/1981 | Huddleston, Jr. et al. | 528/500 |
| 4,695,621 | 9/1987 | Allada | 528/483 |

FOREIGN PATENT DOCUMENTS

| 1180845 | 1/1985 | Canada | 528/501 |
| 0934811 | 8/1963 | United Kingdom | 528/501 |
| 952628 | 3/1964 | United Kingdom | 523/340 |
| 1138180 | 12/1968 | United Kingdom | 523/342 |
| 1516476 | 7/1978 | United Kingdom | 523/340 |
| 1569637 | 6/1980 | United Kingdom | 523/340 |

Primary Examiner—Joseph L. Schofer
Assistant Examiner—F. M. Teskin
Attorney, Agent, or Firm—Connolly and Hutz

[57] ABSTRACT

A process for the preparation of polymer powders from polymer dispersions by feeding a polymer dispersion continuously into an atomization apparatus and separately therefrom but at the same time also introducing a liquid agent, the dispersion and the liquid agent being completely mixed within at the most one second and the mixture being immediately thereafter dried with evaporation of the volatile constituents to form a powder composed of particles having an average diameter of from 0.05 to 1 mm, and the polymer powders prepared by this process.

1 Claim, No Drawings

PROCESS FOR THE PREPARATION OF POLYMER POWDERS BY SPRAY DRYING

The present invention relates to a process for the preparation of polymer powders by atomization drying, in which liquid agents are mixed with the dispersion of polymer immediately before atomization and the mixture is dried immediately thereafter, and to polymer powders obtained by this process.

Polymers may be obtained in powder form from dispersions (the term is intended to include emulsions) of polymers serving as industrial plastics, in particular thermoplastic moulding compounds, by spray drying. The powder obtained may then be processed to form mouldings, for example by conventional thermoplastic processes.

With this method of processing polymer dispersions, purification of the polymer is not possible and consequently auxiliary substances and impurities (from the polymerisation) remain in the end product. Dispersions of polymers are frequently alkaline or acidic and the basicity or acidity remains in the end product. Corrective additives such as acids, bases, salts, solvents or reagents cannot be introduced into the polymer dispersion prior to spray drying because they would alter the dispersion to such an extent (e.g. by coagulation, gelling, viscosity changes or creaming up) that spray drying would become virtually impossible.

A way has now been found of adding liquid agents to these polymer dispersions and subsequently subjecting the dispersions to atomization drying.

The polymer powders so obtained have considerably improved physical properties, in particular those important in thermoplastic moulding compounds.

A process for the preparation of polymer powders from polymer dispersions has thus been found, wherein a polymer dispersion is continuously fed into an atomization apparatus and the liquid agent is introduced simultaneously but separately, the dispersion and the liquid agent are completely mixed within at the most one second, and immediately thereafter the mixture is dried with evaporation of the volatile constituents to form a powder composed of particles having an average diameter of from 0.05 to 1 mm.

The invention further relates to the polymer powders thus obtained.

The polymer dispersions may be aqueous or organic dispersions, in particular dispersions in alcohols, esters, ketones or aromatic hydrocarbons. Aqueous dispersions are preferred. The liquid agents are preferably inorganic or organic acids such as sulphuric acid, hydrochloric acid, phosphoric acids, acetic acid, propionic acids, carboxylic acids of benzene, stearic acids, palmitic acid, maleic acid and formic acid: or inorganic or organic salts such as halides, sulphates, acetates, formates, benzoates, nitrates, nitriles or stearates of alkali metal or alkaline earth metals, and alcohols, epoxides, anhydrides or amides. If these agents are liquid, they can be introduced as such or in the form of solutions, dispersions or suspensions in suitable media; solid agents can of course only be used as solutions, dispersions or suspensions.

The liquid agents are preferably mixtures of salts and mineral acids and/or $C_1$–$C_8$ carboxylic acids, preferably $C_1$–$C_3$ carboxylic acids, especially if they are pH buffer mixtures. Agents which normally coagulate or cream up the polymer dispersions are particularly preferred.

Polymers of olefinically unsaturated monomers which are thermoplastic are particularly suitable for the purpose of this invention.

Preferred polymers are those of styrene, p-methylstyrene, α-methylstyrene, halogenated styrenes, acrylonitrile, methacrylonitrile, vinyl chloride, vinyl acetate, $C_1$–$C_8$-methacrylic acid esters, maleic acid anhydride, maleic acid esters, maleic acid imides, $C_1$–$C_8$-acrylic acid esters, ethylene, propylene, butadiene, butene-1, isoprene and chloroprene and copolymers and graft copolymers of these monomers.

The following polymers are preferred: Resinous polymers, graft polymers on rubbers, in particular partially cross-linked, particulate graft rubbers, and mixtures thereof with particulate cross-linked rubbers.

Graft polymers in aqueous emulsion are particularly preferred. These graft polymers consist of a rubber component, preferably diene or acrylate rubber, and resin polymers of styrene. α-methylstyrene, methyl methacrylate, acrylonitrile or vinyl acetate grafted on the rubber. Particularly preferred graft polymers have rubber contents of from 5 to 80% by weight, in particular from 10 to 80% by weight. Emulsions of these graft polymers used for the process according to the invention contain particles having an average diameter of from 0.06 to 3 $\mu$m, in particular from 0.08 to 0.9 $\mu$m, determined by light scattering measurements.

Preferred emulsions are distinctly alkaline or distinctly acid and are "neutralized" in the process according to the invention by acids or bases used as agents or they are changed in their pH or their conductivity (e.g. by the addition of electrolyte).

Emulsions with pH values from 8 to 12 treated with carboxylic acid and optionally additional mineral acid salts in the process according to the invention to reduce the pH of the polymer powder to below 7 are particularly suitable.

Suitable atomization apparatus for the process according to the invention include, for example, rotary atomization discs or plates, single material and multimaterial nozzles with or without auxiliary supply of energy (e.g. mechanical vibration) and mixing nozzles with internal or external mixing. Mixing nozzles designed for intensive mixing of the liquid components are particularly suitable. Such intensive mixing may be achieved if a rapidly rotating liquid film of one component is encountered by a rotating liquid film or jet of the second component inside a nozzle and the mixture is discharged through a nozzle bore immediately after mixing and is broken up into fine droplets as a result of the rotation. In nozzles designed for external mixing, the participating liquids do not meet in the form of sprays until they have left the nozzle, and the then undergo mixing. Another method of mixing the liquids consists of first mixing them in known apparatus (e.g. rotary mixing chambers) and immediatetly thereafter breaking them up in known atomization apparatus such as rotation, ultra-sound, pressure twisting or pneumatic atomizers. Processes using atomization apparatus are well known (see K. Masters: Spray-Drying; Leonard Hill, London, 1972). Feeding means supplying a stream of liquid into the atomization apparatus described above by free inflow from a pressurized container or by means of suitable pumps by way of tubes or pipes.

The use of mixing nozzles enables average dwell times of less than 0.1 sec to be achieved but higher dwell times may occur in mixing apparatus used before the atomization apparatus. Dwell times of at the most one sec are achieved in the process according to the invention by using a mixing nozzle.

After atomization, the polymer is dried by vaporization in a hot gas stream or evaporation in a stream of super-heated steam. A preferred method is described below:

A polymer in the form of an aqueous emulsion is supplied to a mixing nozzle with internal mixing device. The liquid agent consists of a solution of an inorganic salt and/or an organic acid which is added to the emulsion in the mixture nozzle and mixed with the emulsion. Both liquids are introduced into the nozzle by means of pumps in which pressures of from 10 to 30 bar occur upstream of the nozzle. After intensive mixing, the mixture leaves the nozzle, e.g. in the form of a hollow spray cone which enters the stream of hot gas or steam of a spray drying tower. At inlet temperatures of the hot gas of from 50° to 400° C., in particular from 100° to 200° C., and outlet temperature of from 50° to 200° C., in particular from 70° to 150° C., the polymer dries to a powder which has particularly advantageous properties for technical application without requiring further purification.

The polymers prepared according to the invention are improved in their thermoplastic processing characteristics and thermostability compared with conventional powders prepared by atomization drying. The advantageous properties are particularly effective when the improved powders are used for the modification of vinyl chloride polymers.

EXAMPLES (I) Polymer emulsions put into the process

Polymer emulsion A

A styrene/butadiene rubber latex (SBR latex) containing a copolymer of 35% by weight of styrene and 65% by weight of butadiene is used as graft stock. The latex has a polymer content of 32.4% by weight and an average latex particle diameter ($d_{50}$ value) of 120 nm. The copolymer has a gel content of 88% by weight. The latex was prepared by radical emulsion polymerisation at 60° C., using potassium peroxy disulphate as initiator and the sodium salt of disproportionated abietic acid at pH values of from 11 to 12.

The graft polymer is prepared in accordance with the following Table.

TABLE 1

| | | Parts by weight |
|---|---|---|
| Solution 1: | SBR latex | 1,723 |
| | Water | 1,140 |
| Solution 2: | Potassium peroxy disulphate | 10 |
| | Water | 300 |
| Solution 3: | α-Methylstyrene | 773 |
| | Methylmethacrylate | 1,243 |
| | Acrylonitrile | 224 |
| | tert.-Dodecylmercaptan | — |
| Solution 4: | Water | 3,000 |
| | Sodium salt of disproportionated abietic acid | 45 |
| | 1N sodium hydroxide solution | 40 |

Solution 1 is introduced into a reactor. After it has been heated to 70° C. and initiated with Solution 2, Solutions 3 and 4 are added within 5 hours. After-polymerisation is then carried out for 4 hours at 70° C. After cooling to 20° C., the latex is stabilized with 1.2 parts by weight of phenolic antioxidants, based on 100 parts of graft polymer.

Polymer Emulsion B

Aqueous emulsion of a graft polymer of 30% by weight of acrylonitrile and 70% by weight of styrene on a polybutadiene rubber (average particle diameter ($d_{50}$) 0.38 μm; gel content 88% by weight). The graft polymer contains 30% by weight of rubber and 70% by weight of styrene/acrylonitrile resin. The emulsion was prepared by radical emulsion polymerisation (initiated by means of potassium peroxy disulphate) of a styrene-acrylonitrile mixture on the polybutadiene at a pH of from 10 to 12, using sodium salts of disproportionated abietic acids as emulsifiers. Polymerisation temperature: 60° to 70° C.

(II) Working up

General description of process

The polymer emulsion is fed from a dosing pump into a mixing nozzle designed for internal mixing. The liquid agent consists of an aqueous solution of an inorganic salt and/or an organic acid. It is also introduced into the nozzle by a dosing pump at a fixed quantitative ratio to the polymer emulsion. The resulting mixture leaves the nozzle at the top of a spray drying tower in the form of a hollow spray cone composed of droplets measuring from 10 to 500 μm in diameter. The drying medium used is air with reduced oxygen content (less tha 5%). This air is recirculated with the addition of nitrogen and enters the spray drier at temperatures $T_{in}$ of from 150° to 200° C. and leaves the drier at temperatures of $T_{out}$ of 50° to 100° C. In the spray drying tower, the polymer is dried from its initial water content of from 50 to 80% to a residual water content of from 0.05 to 2%, and during this process agglomeration and/or a chemical reaction may take place in the flying droplets to improve the physical properties of the polymer powder.

(II1) Working up of polymer emulsion A by the process described above

Air temperatures: $T_{in}$=170° C.±5° C., $T_{out}$=80° C.±30° C. The quantity of air is then approximately 25 to 30 times the quantity of water to be evaporated. Emulsion A is supplied as main mass stream to an internally mixing nozzle (manufactured by Schlick, Model 770/1) by means of an eccentric screw pump while the bias pressure in the nozzle is about 15 bar. A solution of 30 g of magnesium sulphate per 5 g of acetic acid in 250 g of water is supplied as smaller liquid stream per kg of solids content of emulsion A by means of a correspondingly smaller dosing pump. On leaving the spray drier and separation from the air stream, the dried polymer powder has residual moisture contents of from 0.2 to 0.8%.

(II2) Working up of emulsion B by the process described above

Air temperatures, $T_{in}$=160° to 170° C.; $T_{out}$=80° C.±3° C. The quantity of air is approximately equal to 25 to 30 times the quantity of water to be evarporated. Emulsion B is supplied as main stream to an internally mixing nozzle of Schlick, Model 770/1 by means of an eccentric screw pump, the bias pressure in the nozzle being approximatly 10 to 12 bar. 100 g of a 4% by weight solution of magnesium sulphate ($MgSo_4$) in water per 1 kg of solids content of emulsion B are supplied to the mixing nozzle from a dosing pump. On leaving the spray drier and separation from the stream of moisture, the dried polymer powder has a residual moisture content of about 0.5%.

(II3) Working up of emulsion B

By a method analogous to that of process (II2) using 100 g of a 3% by weight solution of calcium formate per 1 kg of solids content in emulsion B. On leaving the spray drier and separation from the air stream, the dried powder has a residual moisture content of about 0.5% by weight.

(II4) Process for working up emulsion B

The process is analogous to that of II3, using an aqueous solution of aluminium sulphate. The residual moisture contents of the powder were in the range of from 0.3 to 0.5% by weight.

(III) Comparison Examples

Spray drying by known processes (for details see K. Masters, "Spray Drying", Leonard Hill, London, 1972) without the addition of electrolyte.

The polymer emulsion is delivered to a pressure nozzle (one-material nozzle) or a pneumatic nozzle (atomization with compressed air) by means of a pump. The spray of droplets produced dries in a stream of hot gas in a spray drier and the stream of hot gas is recirculated with the addition of nitrogen. The droplet size is from 5 to 500 μm. The air inlet temperature $T_{in}$ is from 150° to 200° C., and the temperature of the discharged air is from 50° to 100° C. The nozzle bias pressure is from 10 to 30 bar in pressure nozzles and from 1.5 to 10 bar in pneumatic nozzles.

(III1) Comparison of polymer emulsion A to (II1) by this process

Polymer emulsion A is atomized in a pressure nozzle of DELAVAN, MODEL SDX, using a nozzle bias pressure of 25 bar. At $T_{in} \sim 170°$ C. and $T_{out} \sim 80°$ C., the quantity of air is about 25 to 30 times the quantity of water to be evaporated. On leaving the spray drier and separation from the air stream, the dried polymer powder has residual moisture contents of from 0.2 to 0.8%.

(III2) Comparison of polymer emulsion B to (II2) to (II4) by this process

Polymer emulsion B is atomized with a pressure nozzle of DELAVAN, MODEL SDX, at a nozzle pressure of 18 bar. At $T_{in} \sim 165°$ C. and $T_{out} \sim 80°$ C., the quantity of air is about 25 to 30 times the quantity of water to be evaporated. On leaving the spray drier and separation from the air stream, the dried polymer powder has residual moisture contents of about 0.5%.

(IV) Properties of polymers as modifiers for polyvinyl chloride

Products (II1) and (III1) were worked up into thermoplastic moulding compounds either directly or in admixture with PVC.

For the preparation of PVC moulding compounds, polyvinyl chloride (PVC) (K-value 70) is used. 2% by weight of Ba/Cd laurate (solid) are added as stabilizer and lubricant and 0.3% by weight of sterically hindered phenolic anti-oxidant (solid and 0.2% by weight ester wax) are also added. The PVC moulding compounds are homogenized in admixture with (II1) and (III1) on mixing rollers for 10 minutes (at 180° C.) and pressed to form moulded products at 190° C. The composition of the moulding compounds is shown in Table 3.

For comparison with product (III1), products (II1) are worked up into moulded bodies at 240° C. The products having the following properties:

TABLE 2

|  | Product II1 | Product III1 |
|---|---|---|
| Notched impact strength(kJ/m$^2$) | 7.9 | 6 |
| Dimensional stability Vicat B(°C.) | 111 | 110 |
| Cloudiness (%) | 8 | 20 |

TABLE 3

Moulding compounds containing PVC: Mixtures of 60 parts by weight of PVC and 40 parts by weight of graft polymer II1 and III1

| Blend | with II1 | with III1 |
|---|---|---|
| Impact strength (kg/m$^2$) | unbroken | unbroken |
| Notched impact strength (kg/m$^2$) | 6.5 | 6 |
| Dimensional stability (Vicat B, °C.) | 95 | 93 |
| Cloudiness (%) | 9 | 25 |
| Light transmission (%) | 70 | 55 |
| Raw tone | colourless to pale yellow | yellow to brown |
| Processing of mixture | moulding compound shows no unwanted sticking to rollers during processing | moulding compound sticks to rollers during homogenization |

Notes to Tables 2 and 3:
Impact strength and notched impact strength determined according to DIN 53 453
Dimensional stability determined according to DIN 53 460
Cloudiness and light transmission determined according to DIN 5 036

TABLE 4

Measurement of "Window Fogging" of the powders (according to DIN 75 201) at 90° C.

| Products | Gloss measurement (%) |
|---|---|
| II2 | 88 |
| II3 | 87 |
| II4 | 78 |
| II2 | 0 |

We claim:

1. A process for the preparation of polymer powders from polymer dispersions, wherein a polymer dispersion is continuously fed into an atomization apparatus and a liquid agent is introduced simultaneously but separately, the dispersion and the liquid agent are completely mixed within at the most one second, and immediately thereafter the mixture is dried with evaporation of the volatile constituents to form a powder composed of particles having an average diameter of from 0.05 to 1 mm.

* * * * *